United States Patent
Moore et al.

(10) Patent No.: US 7,970,688 B2
(45) Date of Patent: Jun. 28, 2011

(54) METHOD FOR PRICING A TRADE

(75) Inventors: Stephen G. Moore, London (GB);
Gordon Davies, Warlingham (GB);
Adam Weiner, London (GB)

(73) Assignee: JP Morgan Chase Bank, New York, NY (US)

( * ) Notice: Subject to any disclaimer, the term of this patent is extended or adjusted under 35 U.S.C. 154(b) by 1312 days.

(21) Appl. No.: 10/757,940

(22) Filed: Jan. 15, 2004

(65) Prior Publication Data

US 2005/0027658 A1   Feb. 3, 2005

Related U.S. Application Data

(60) Provisional application No. 60/490,977, filed on Jul. 29, 2003.

(51) Int. Cl.
*G06Q 40/00* (2006.01)

(52) U.S. Cl. .......................................................... 705/37

(58) Field of Classification Search .............. 705/35–37; 707/661–665, 692; 714/6
See application file for complete search history.

(56) References Cited

U.S. PATENT DOCUMENTS

| | | |
|---|---|---|
| 4,169,285 A | 9/1979 | Walker |
| 4,648,038 A | 3/1987 | Roberts et al. |
| 4,739,478 A | 4/1988 | Roberts et al. |
| 4,742,457 A | 5/1988 | Leon et al. |
| 4,752,877 A | 6/1988 | Roberts et al. |
| 4,933,842 A | 6/1990 | Durbinet et al. |
| 5,121,469 A | 6/1992 | Richards et al. |
| 5,222,019 A | 6/1993 | Yoshino et al. |
| 5,257,369 A | 10/1993 | Skeen et al. |
| 5,270,922 A | 12/1993 | Higgins |
| 5,297,032 A | 3/1994 | Trojan et al. |
| 5,305,200 A | 4/1994 | Hartheimer et al. |
| 5,419,890 A | 5/1995 | Saidi |
| 5,454,104 A | 9/1995 | Steidlmayer et al. |
| 5,462,438 A | 10/1995 | Becker et al. |
| 5,497,317 A | 3/1996 | Hawkins et al. |
| 5,517,406 A | 5/1996 | Harris et al. |
| 5,557,798 A | 9/1996 | Skeen et al. |
| 5,563,783 A | 10/1996 | Stolfo et al. |
| 5,592,379 A | 1/1997 | Finfrock et al. |

(Continued)

FOREIGN PATENT DOCUMENTS

WO    98/43170    10/1998

(Continued)

OTHER PUBLICATIONS

"Specialized Financial Applications", Wall Street & Technology, v11, n8, p. 132(12), Annual, 1994.*

(Continued)

*Primary Examiner* — Mary Cheung
(74) *Attorney, Agent, or Firm* — Lowenstein Sandler P.C.

(57) ABSTRACT

A method for pricing a trade comprising providing a user input for entering trade data, providing a structure for receiving the trade data and then transmitting the structure to a pricing system. The structure, now populated with both the trade data and the pricing data, is received from the pricing system and the trade data and pricing information is displayed. Advantageously, the structure is encrypted prior to transmitting it to the pricing system and decrypted when received from the pricing system. The pricing system records the data and the pricing information, which may be automatically entered into a trading system if and when the user agrees.

14 Claims, 9 Drawing Sheets

U.S. PATENT DOCUMENTS

| | | |
|---|---|---|
| 5,649,186 A | 7/1997 | Ferguson |
| 5,675,746 A | 10/1997 | Marshall |
| 5,706,502 A | 1/1998 | Foley et al. |
| 5,710,889 A | 1/1998 | Clark et al. |
| 5,724,593 A | 3/1998 | Hargrave, III et al. |
| 5,778,157 A | 7/1998 | Oatman et al. |
| 5,787,402 A * | 7/1998 | Potter et al. .................. 705/37 |
| 5,806,047 A | 9/1998 | Hackel et al. |
| 5,806,048 A | 9/1998 | Kiron et al. |
| 5,819,273 A | 10/1998 | Vora et al. |
| 5,832,461 A | 11/1998 | Leon et al. |
| 5,845,266 A | 12/1998 | Lupien et al. |
| 5,864,827 A | 1/1999 | Wilson |
| 5,890,140 A | 3/1999 | Clark et al. |
| 5,913,214 A | 6/1999 | Madnick et al. |
| 5,918,218 A | 6/1999 | Harris et al. |
| 5,922,044 A | 7/1999 | Banthia |
| 5,940,810 A | 8/1999 | Traub et al. |
| 5,944,784 A | 8/1999 | Simonoff et al. |
| 5,946,667 A | 8/1999 | Tull, Jr. et al. |
| 5,950,176 A | 9/1999 | Keiser et al. |
| 5,966,531 A | 10/1999 | Skeen et al. |
| 5,966,672 A | 10/1999 | Knupp |
| 5,970,479 A | 10/1999 | Shepherd |
| 5,986,673 A | 11/1999 | Martz |
| 5,995,943 A | 11/1999 | Bull et al. |
| 6,006,206 A | 12/1999 | Smith et al. |
| 6,012,046 A | 1/2000 | Lupien et al. |
| 6,018,714 A | 1/2000 | Risen, Jr. |
| 6,018,721 A | 1/2000 | Aziz et al. |
| 6,023,280 A | 2/2000 | Becker et al. |
| 6,029,146 A | 2/2000 | Hawkins et al. |
| 6,029,147 A | 2/2000 | Horadan et al. |
| 6,035,287 A | 3/2000 | Stallaert et al. |
| 6,049,783 A | 4/2000 | Segal et al. |
| 6,052,673 A | 4/2000 | Leon et al. |
| 6,055,522 A | 4/2000 | Krishna et al. |
| 6,058,378 A | 5/2000 | Clark et al. |
| 6,061,662 A | 5/2000 | Makivic |
| 6,064,984 A | 5/2000 | Ferguson et al. |
| 6,073,104 A | 6/2000 | Field |
| 6,073,115 A | 6/2000 | Marshall |
| 6,078,914 A | 6/2000 | Redfern |
| 6,078,956 A | 6/2000 | Bryant et al. |
| 6,081,774 A | 6/2000 | de Hita et al. |
| 6,088,685 A | 7/2000 | Kiron et al. |
| 6,092,056 A | 7/2000 | Tull, Jr. et al. |
| 6,105,005 A | 8/2000 | Fuhrer |
| 6,131,082 A | 10/2000 | Hargrave, III et al. |
| 6,134,600 A | 10/2000 | Liu |
| 6,148,298 A | 11/2000 | LaStrange et al. |
| 6,173,270 B1 | 1/2001 | Cristofich et al. |
| 6,173,276 B1 | 1/2001 | Kant et al. |
| 6,178,420 B1 | 1/2001 | Sassano |
| 6,185,567 B1 | 2/2001 | Ratnaraj et al. |
| 6,195,647 B1 | 2/2001 | Martyn et al. |
| 6,226,623 B1 | 5/2001 | Schein et al. |
| 6,233,566 B1 | 5/2001 | Levine et al. |
| 6,236,972 B1 | 5/2001 | Shkedy |
| 6,236,977 B1 | 5/2001 | Verba et al. |
| 6,243,670 B1 | 6/2001 | Bessho et al. |
| 6,260,021 B1 | 7/2001 | Wong et al. |
| 6,263,321 B1 | 7/2001 | Daughtery, III |
| 6,263,335 B1 | 7/2001 | Paik et al. |
| 6,266,683 B1 | 7/2001 | Yehuda et al. |
| 6,272,474 B1 | 8/2001 | Garcia |
| 6,275,229 B1 | 8/2001 | Weiner et al. |
| 6,278,982 B1 | 8/2001 | Korhammer et al. |
| 6,282,537 B1 | 8/2001 | Madnick et al. |
| 6,285,986 B1 | 9/2001 | Andrews |
| 6,285,989 B1 | 9/2001 | Shoham |
| 6,304,858 B1 | 10/2001 | Mosler et al. |
| 6,313,854 B1 | 11/2001 | Gibson |
| 6,317,726 B1 | 11/2001 | O'Shaughnessy |
| 6,317,728 B1 | 11/2001 | Kane |
| 6,321,212 B1 | 11/2001 | Lange |
| 6,323,881 B1 | 11/2001 | Broulik et al. |
| 6,332,163 B1 | 12/2001 | Bowman-Amuah |
| 6,338,055 B1 | 1/2002 | Hagmann et al. |
| 6,338,068 B1 | 1/2002 | Moore et al. |
| 6,343,287 B1 | 1/2002 | Kumar et al. |
| 6,347,307 B1 | 2/2002 | Sandhu et al. |
| 6,349,291 B1 | 2/2002 | Varma |
| 6,356,933 B2 | 3/2002 | Mitchell et al. |
| 6,360,210 B1 | 3/2002 | Wallman |
| 6,366,908 B1 | 4/2002 | Chong et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,401,080 B1 | 6/2002 | Bigus et al. |
| 6,408,282 B1 | 6/2002 | Buist |
| 6,418,417 B1 | 7/2002 | Corby et al. |
| 6,421,653 B1 | 7/2002 | May |
| 6,424,980 B1 | 7/2002 | Iizuka et al. |
| 6,429,868 B1 | 8/2002 | Dehner, Jr. et al. |
| 6,442,545 B1 | 8/2002 | Feldman et al. |
| 6,446,110 B1 | 9/2002 | Lection et al. |
| 6,457,066 B1 | 9/2002 | Mein et al. |
| 6,460,021 B1 | 10/2002 | Kirksey |
| 6,480,882 B1 | 11/2002 | McAdam et al. |
| 6,489,954 B1 | 12/2002 | Powlette |
| 6,490,584 B2 | 12/2002 | Barrett et al. |
| 6,493,681 B1 | 12/2002 | Tertitski et al. |
| 6,510,406 B1 | 1/2003 | Marchisio |
| 6,516,303 B1 | 2/2003 | Wallman |
| 6,516,308 B1 | 2/2003 | Cohen |
| 6,523,022 B1 | 2/2003 | Hobbs |
| 6,556,987 B1 | 4/2003 | Brown et al. |
| 6,564,250 B1 | 5/2003 | Nguyen |
| 6,581,056 B1 | 6/2003 | Rao |
| 6,581,062 B1 | 6/2003 | Draper et al. |
| 6,598,028 B1 | 7/2003 | Sullivan et al. |
| 6,601,044 B1 | 7/2003 | Wallman |
| 6,611,825 B1 | 8/2003 | Billheimer et al. |
| 6,615,187 B1 | 9/2003 | Ashenmil et al. |
| 6,629,097 B1 | 9/2003 | Keith |
| 6,631,373 B1 | 10/2003 | Otani et al. |
| 6,633,868 B1 | 10/2003 | Min et al. |
| 2001/0011241 A1 | 8/2001 | Nemzow |
| 2001/0011242 A1 | 8/2001 | Allex et al. |
| 2001/0018674 A1 | 8/2001 | Schein et al. |
| 2001/0025264 A1 | 9/2001 | Deaddio et al. |
| 2001/0032217 A1 | 10/2001 | Huang |
| 2001/0042034 A1 | 11/2001 | Elliott |
| 2001/0043235 A1 | 11/2001 | Best et al. |
| 2001/0044771 A1 | 11/2001 | Usher et al. |
| 2001/0056398 A1 | 12/2001 | Scheirer |
| 2002/0002530 A1 | 1/2002 | May |
| 2002/0004777 A1 | 1/2002 | Foster et al. |
| 2002/0007335 A1 | 1/2002 | Millard et al. |
| 2002/0007358 A1 | 1/2002 | Johnson et al. |
| 2002/0013753 A1 | 1/2002 | Marks de Chabris et al. |
| 2002/0013862 A1 | 1/2002 | Orchard et al. |
| 2002/0016762 A1 | 2/2002 | Feilbogen et al. |
| 2002/0016819 A1 | 2/2002 | Sugimoto et al. |
| 2002/0018077 A1 | 2/2002 | Powlette |
| 2002/0022956 A1 | 2/2002 | Ukranincsky et al. |
| 2002/0023053 A1 | 2/2002 | Szoc et al. |
| 2002/0026405 A1 | 2/2002 | Haar |
| 2002/0026449 A1 | 2/2002 | Azencott |
| 2002/0026462 A1 | 2/2002 | Shotton, Jr. et al. |
| 2002/0029183 A1 | 3/2002 | Vlahoplus et al. |
| 2002/0032644 A1 | 3/2002 | Corby et al. |
| 2002/0035561 A1 | 3/2002 | Archer et al. |
| 2002/0042767 A1 | 4/2002 | Kwan |
| 2002/0049666 A1 | 4/2002 | Reuter et al. |
| 2002/0054115 A1 | 5/2002 | Mack et al. |
| 2002/0059141 A1 | 5/2002 | Davies et al. |
| 2002/0065752 A1 | 5/2002 | Lewis |
| 2002/0065755 A1 | 5/2002 | Shlafman et al. |
| 2002/0069114 A1 * | 6/2002 | Charette et al. .................. 705/26 |
| 2002/0069157 A1 | 6/2002 | Jordan |
| 2002/0073007 A1 | 6/2002 | Ayache |
| 2002/0078253 A1 | 6/2002 | Szondy et al. |
| 2002/0087373 A1 | 7/2002 | Dickstein et al. |

| | | | |
|---|---|---|---|
| 2002/0087454 | A1 | 7/2002 | Calo et al. |
| 2002/0087455 | A1 | 7/2002 | Tsagarakis et al. |
| 2002/0087457 | A1 | 7/2002 | Madeley et al. |
| 2002/0099646 | A1 | 7/2002 | Agarwal et al. |
| 2002/0099656 | A1 | 7/2002 | Poh Wong |
| 2002/0112056 | A1 | 8/2002 | Baldwin et al. |
| 2002/0123947 | A1 | 9/2002 | Yuste et al. |
| 2002/0130868 | A1 | 9/2002 | Smith |
| 2002/0138390 | A1 | 9/2002 | May |
| 2002/0147671 | A1 | 10/2002 | Sloan et al. |
| 2002/0152154 | A1 | 10/2002 | Rothman et al. |
| 2002/0152156 | A1 | 10/2002 | Tyson-Quah |
| 2002/0156658 | A1 | 10/2002 | Selesny et al. |
| 2002/0156719 | A1* | 10/2002 | Finebaum et al. .............. 705/37 |
| 2002/0161692 | A1 | 10/2002 | Loh et al. |
| 2002/0161853 | A1 | 10/2002 | Burak et al. |
| 2002/0169707 | A1 | 11/2002 | Koek et al. |
| 2002/0174043 | A1 | 11/2002 | Gilbert et al. |
| 2002/0178096 | A1 | 11/2002 | Marshall |
| 2002/0184132 | A1 | 12/2002 | Foster |
| 2002/0184237 | A1 | 12/2002 | McFeely |
| 2002/0194097 | A1 | 12/2002 | Reitz |
| 2002/0194114 | A1 | 12/2002 | Erdmier |
| 2003/0004942 | A1 | 1/2003 | Bird |
| 2003/0009411 | A1 | 1/2003 | Ram et al. |
| 2003/0018558 | A1 | 1/2003 | Heffner et al. |
| 2003/0018714 | A1 | 1/2003 | Mikhailov et al. |
| 2003/0033212 | A1 | 2/2003 | Sandhu et al. |
| 2003/0037174 | A1 | 2/2003 | Lavin et al. |
| 2003/0065594 | A1 | 4/2003 | Murphy |
| 2003/0066025 | A1 | 4/2003 | Garner et al. |
| 2003/0066032 | A1 | 4/2003 | Ramachandran et al. |
| 2003/0078869 | A1 | 4/2003 | Williams |
| 2003/0088496 | A1 | 5/2003 | Piotrowski |
| 2003/0093360 | A1 | 5/2003 | May |
| 2003/0093362 | A1 | 5/2003 | Tupper et al. |
| 2003/0093565 | A1 | 5/2003 | Berger et al. |
| 2003/0105981 | A1 | 6/2003 | Miller et al. |
| 2003/0115122 | A1 | 6/2003 | Slater et al. |
| 2003/0126063 | A1 | 7/2003 | Reuter et al. |
| 2003/0126068 | A1 | 7/2003 | Hauk et al. |
| 2003/0126069 | A1 | 7/2003 | Cha |
| 2003/0126117 | A1 | 7/2003 | Megiddo et al. |
| 2003/0140035 | A1 | 7/2003 | Burrows |
| 2003/0149653 | A1 | 8/2003 | Penney et al. |
| 2003/0154071 | A1 | 8/2003 | Shreve |
| 2003/0188255 | A1 | 10/2003 | Shimizu et al. |
| 2003/0220861 | A1 | 11/2003 | Broms et al. |
| 2003/0220868 | A1 | 11/2003 | May |
| 2003/0233459 | A1 | 12/2003 | Miller et al. |
| 2003/0236862 | A1 | 12/2003 | Miller et al. |
| 2003/0236957 | A1 | 12/2003 | Miller et al. |
| 2004/0024610 | A1* | 2/2004 | Fradkov et al. .................. 705/1 |
| 2004/0039692 | A1 | 2/2004 | Shields et al. |
| 2004/0064397 | A1 | 4/2004 | Lynn et al. |
| 2004/0068559 | A1 | 4/2004 | Shaw |
| 2004/0078248 | A1 | 4/2004 | Altschuler |
| 2004/0103003 | A1 | 5/2004 | Mayers et al. |
| 2004/0128169 | A1 | 7/2004 | Lusen |
| 2004/0148247 | A1 | 7/2004 | Miller et al. |
| 2004/0148259 | A1 | 7/2004 | Reiners et al. |
| 2004/0162742 | A1* | 8/2004 | Stoker et al. ....................... 705/7 |
| 2004/0162772 | A1* | 8/2004 | Lewis .............................. 705/34 |
| 2004/0162775 | A1 | 8/2004 | Winklevoss et al. |
| 2004/0167850 | A1 | 8/2004 | Dreyer et al. |
| 2004/0220885 | A1 | 11/2004 | Salzmann et al. |
| 2004/0225596 | A1 | 11/2004 | Kemper et al. |
| 2005/0060256 | A1 | 3/2005 | Peterson et al. |
| 2005/0086170 | A1 | 4/2005 | Rao |

FOREIGN PATENT DOCUMENTS

| | | |
|---|---|---|
| WO | 01/20530 | 3/2001 |
| WO | 01/37540 | 5/2001 |
| WO | 01/57716 | 8/2001 |
| WO | 01/59670 | 8/2001 |
| WO | 02/03774 | 1/2002 |
| WO | 02/14991 | 2/2002 |
| WO | 02/054189 | 7/2002 |
| WO | 02/056146 | 7/2002 |
| WO | 02/063516 | 8/2002 |
| WO | 02/065278 | 8/2002 |
| WO | 02/065286 | 8/2002 |
| WO | 03/012588 | 2/2003 |
| WO | 03/030013 | 4/2003 |
| WO | 03/032158 | 4/2003 |
| WO | 03/065256 | 8/2003 |
| WO | 03/102733 | 12/2003 |

OTHER PUBLICATIONS

Silverman; A New Strategy for Giving Away Your Money, Wall Street Journal, D1, Oct. 6, 2004.
Unknown; Investigating Systems; Oct. 21, 2002.
Elkayam; Using Indexed Bonds to Estimate a Central Bank Reaction Function; Prelim. Draft; Apr. 11, 2002.
Ericson; SOFTWERC Releases Patent-Pending.
IBM Corp.; Strict Read Order Control for a Queing System.
Novell, Inc.; Beginning of Viewing Information and Viewing Basic Information About a Print Job; Publ. Jun. 1, 1993.
Hewlett-Packard; x4queview.org; Publ. Mar. 1992.
Electronic Trading Tools;www.gheo.com/custerservices/trading_platform.asp.
Fast Email Extractor 4.4; www.lecom.com/fee.html; Sep. 2, 2003.
Intellseek and Inxight Partner to Provide New Business Intelligence Solutions, www.inxight.com/news/021029_intelliseek.html, Oct. 29, 2002.
Myllymaki; With Standard XML Technologies; IBM Almaden Research Center; May 2, 2001.
Ribiero-Neto et al.; Top Down Extraction of Semi-Structured Data, String Processing and Information Retrieval Symposium & AMP; p. 176; Sep. 21, 1999.
Rupali et al.; Phrase-Based Text Representation for Managing the Web Documents; p. 165; Apr. 28, 2003.
May; Modeling and Querying Structure and Contents of the Web, 10th International Workshop on Database & AMP; Expert Systems Applications, Sep. 1, 1999, p. 721.
Manco et al.; A Framework for Adaptive Mail Classification, 14th IEEE Conference on Tools With Artificial Intelligence (ICTAI'02), Nov. 4, 2002, p. 387.
Carchiolo et al.; Structuring the Web; 11th International Workshop on Database and Expert Ssytems Applications (DEX A'00); Sep. 6, 2000.
Lam et al.; Querying Web Data—The WEBQA Approach; p. 139; Dec. 12, 2002.
Witten et al.; Text Mining: A New Frontier for Lossless Compression; p. 198; Mar. 29, 1999.
Calado; The Web-DL Environment for Building Digital Libraries From the Web.
Czejdo; Automatic Generation Ontology Based Anntations in XML and Their Use in Retrieval Systems, Web Information Systems Engineering, 2000, Proceedings of the First International Conference, Jun. 19, 2000, p. 296.
Roberts; Top Priority on Bottom Line: More Companies Seeting to Manage Business Risks; p. 3; Mar. 20, 2000.
Chacko; Cephalon, Inc. Taking Risk Management Gherory Seriously.
Pila; In Case of Emergency; Contingent Capital; No. 6, vol. 102, p. 59; ISSN 1527-5914; Sep. 1, 2001.
Kus; Contingent Capital: Just in the Capital Management Sets a New Standard; Sponsored Statement; p. 30; ISSN: 0958; Oct. 1, 2002.
Rising to the Challenge of Global STP, Euromoney Publications PLC Global Inventor, Nov. 1, 1999, pp. 51-52; ISSN. 0951-3604.
Fan et al.; The Internet and Future Financial Markets; Industry Trend or Event, Association for Computing Machinery, Inc., Sec. 11, vol. 43; Nov. 1, 2000, p. 82; ISSN: 0001-0782.
STP in the Bond Market?, Wall Street & Technology, Dec. 1, 2002, p. 20.
Tradeweb's STP Vision, Euromoney Institutional Investor PLC, Sec. 406, vol. 34, Feb. 1, 2003, p. S6; ISSN: 0014-2433.
Block Trades Market Practice, Apr. 1, 2003, pp. 1-10.
Martin: Email Report, Issue 11, Aug. 16, 2001, printed Aug. 2, 2005.
Emery, et al.; The Measurement of Liquidity, Journal of Accounting Research, vol. 20, No. 2, Part 1, p. 290-303, Autumn 1982.
Form 10-K, United States Securities and Exchange Commission, No Date,Year Ending Dec. 31, 2003.

* cited by examiner

METHOD FOR PRICING A TRADE

CROSS-REFERENCE TO RELATED APPLICATIONS

This application claims the benefit of U.S. Provisional Application No. 60/490,977 filed Jul. 29, 2003.

FIELD OF THE INVENTION

This invention relates to the field of financial transactions, and, more specifically, to a method for pricing a foreign exchange trade in a user system either manually or automatically.

BACKGROUND OF THE INVENTION

Currently, some financial transactions, for example, transactions in foreign exchange, are performed person-to-person (e.g., over the telephone or in person). That is, a trader contacts a broker with a proposed transaction, the broker prices the transaction and, if the trader agrees, the transaction is executed. If the trader wants to record the transaction, he or she enters the transaction into a financial spread sheet or database (herein referred to as "treasury system"). It is clear that many errors may enter into this system: the broker may enter the wrong data, the user may enter the wrong data or both, resulting in, at best, conflicting information between the two. To alleviate this situation, financial transactions are increasingly becoming automated: the trader enters a transaction into his or her system, which is then executed by a serving financial institution.

There exists, however, a tension between facilitating financial transactions automatically and executing financial transactions over the telephone or in person. Automatic transactions captures data regarding the transaction exactly as the trader enters it. The transaction is then executed using the captured data. There is no person in the middle that can potentially make errors in recording a transaction. On the other hand, there is no personal interaction with a sales or marketing person at a financial institution, which provides the customer with advice and the financial institution with customer loyalty.

SUMMARY OF THE INVENTION

This problem is solved and a technical advance is achieved in the art by a method for pricing a trade comprising providing a user input for entering trade data, providing a structure for receiving the trade data and then transmitting the structure to a pricing system. Next, the structure, now populated with both the trade data and the pricing data, is received from the pricing system and the trade data and pricing information is displayed. Advantageously, the structure is encrypted prior to transmitting it to the pricing system and decrypted when received from the pricing system.

Further, and in accordance with another aspect of this invention, data representing one or more trades from a user treasury system is translated into a form suitable for use in the structure and, after the trade is priced, the data in the structure is translated into a form suitable for use in the user treasury system. Pricing information may also be entered manually by the user.

According to another aspect of the invention, the pricing system records the data and the pricing information, which may be automatically entered into a trading system if and when the user agrees.

BRIEF DESCRIPTION OF THE DRAWINGS

A more complete understanding of this invention may be obtained from a consideration of this specification taken in conjunction with the drawings, in which.

DETAILED DESCRIPTION

This invention is described herein in terms of a user application entitled "MailXpress," which will become available from JP Morgan, the assignee of this application. MailXpress is specifically designed for Foreign Exchange. While this invention is described in terms of Foreign Exchange, one skilled in the art will appreciate how to apply the principles of this invention to other forms of financial trading after studying this specification.

MailXpress is an application designed to help clients of a financial institution (e.g., JP Morgan) with bulk order Foreign Exchange execution. It presents the clients' prospective orders in currency and currency pair structures. These structures can also be broken down further, for example, by value date.

Trades can be individually entered into MailXpress manually through the fast "Trade Input" text area. Alternatively, batches of trades may be loaded in the form of a text file. Such text files are input from the client's internal treasury system with the file structure being specified using the MailXpress Input Wizard. A format only needs to be set up once, there after all files of that format can be loaded easily. More than one format may be stored in MailXpress.

The client can use MailXpress to view his or her position using a set of provided market rates stored within MailXpress. The user can also price the deals by manually entering in spot rates, forward points, cross rates or cross points while on the phone to the financial institution.

Importantly, an output structure of unpriced trades can be exported from MailXpress and attached to or included in an email (which includes a client identification) and sent to the financial institution for pricing. This exported structure is of a standard MailXpress file format. This file is encrypted because of the sensitive nature of the data.

The financial institution receives the email, decrypts it and extracts client identification and the structure. The financial institution parses the data in the structure and adds pricing and other information to the structure. The structure is again encrypted and returned to the client.

After receiving the encrypted, priced structure back from the financial institution, the client decrypts the structure and loads it into MailXpress. MailXpress then contains all the priced deals. These priced deals can be exported to an unencrypted text file to be loaded to the client's treasury system. The format of the exported file can be specified using the MailXpress output Wizard.

Figure 1:
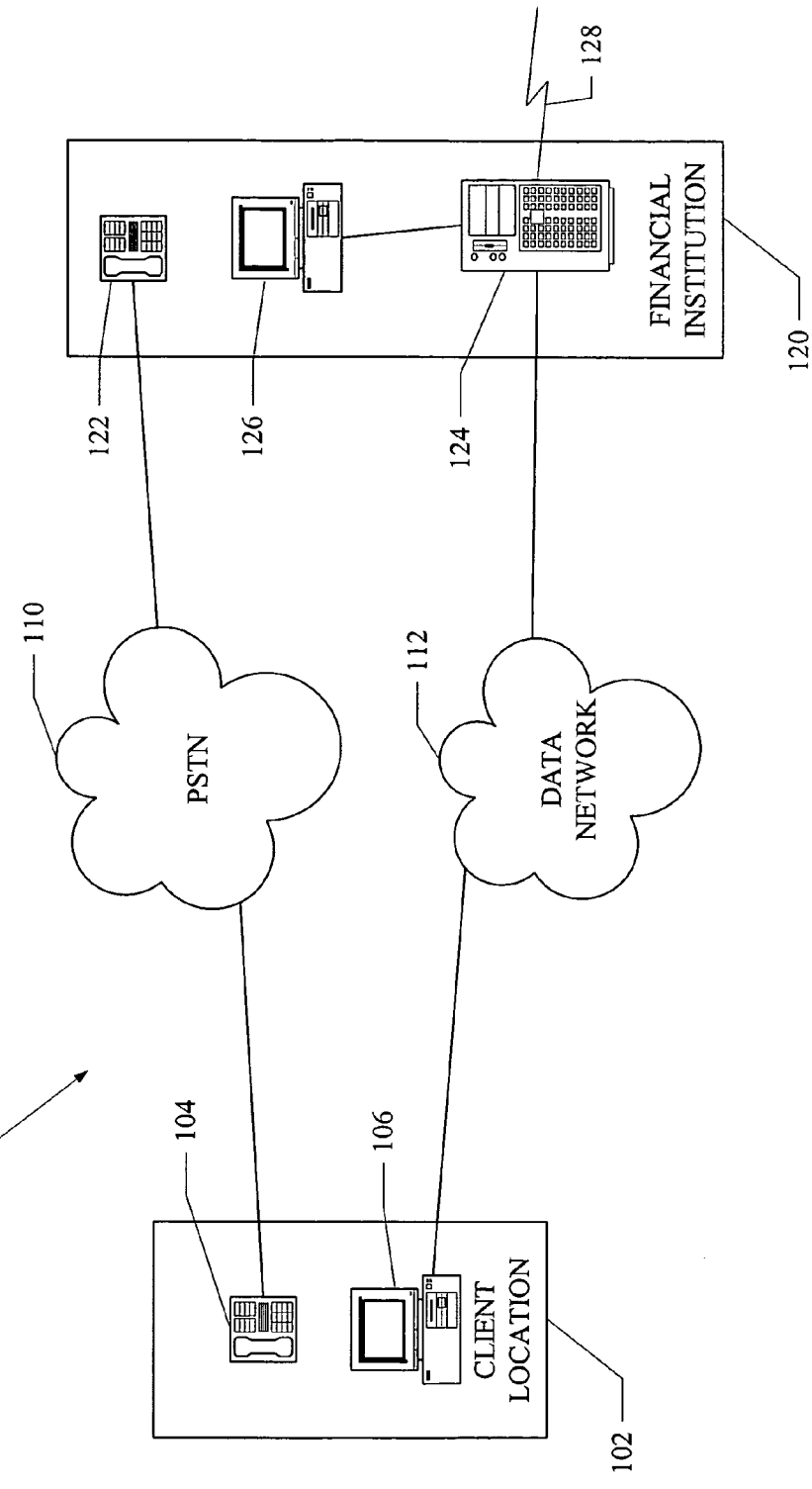
FIG. 1 is a block diagram of an exemplary telephone and data network in which an exemplary embodiment of this invention may be employed.

Turning now to FIG. 1, a block diagram of a context in which an exemplary embodiment of this invention operates is shown generally at 100. A client location 102, which may comprise a broker, dealer, or individual, is illustrated herein as having a telephone 104 and a personal computer (PC) 106. It is envisioned that MailXpress operates in PC 106. While this invention is described in terms of PC 106, one skilled in the art will appreciate that any form of computational device will perform the tasks described herein, after studying this specification.

Telephone 104 is connected to the public switched telephone network (PSTN) 110, as known in the art. PC 106 is connected to a data network 112. Data network 112 may comprise the Internet, a private data network or a combination of both.

A financial institution 120, which, in this exemplary embodiment, is JP Morgan, is also connected to PSTN at telephone 122 and at server 124. Telephone 122 is used by, for example, a broker who is assisting the client with his or her foreign exchange transaction. Server 124 is connected to another PC 126, which may be used, for example, by the broker that uses telephone 122. Server 124 collects data regarding the foreign exchange market by way of data network 112, communications link 128 or both. Server 124 also receives, decrypts, prices, encrypts and transmits MailXpress transactions according to one aspect of this invention. Further, server 124 may be in communication with an order execution server at financial institution 120, through which server 124 may automatically place orders.

Figure 2:
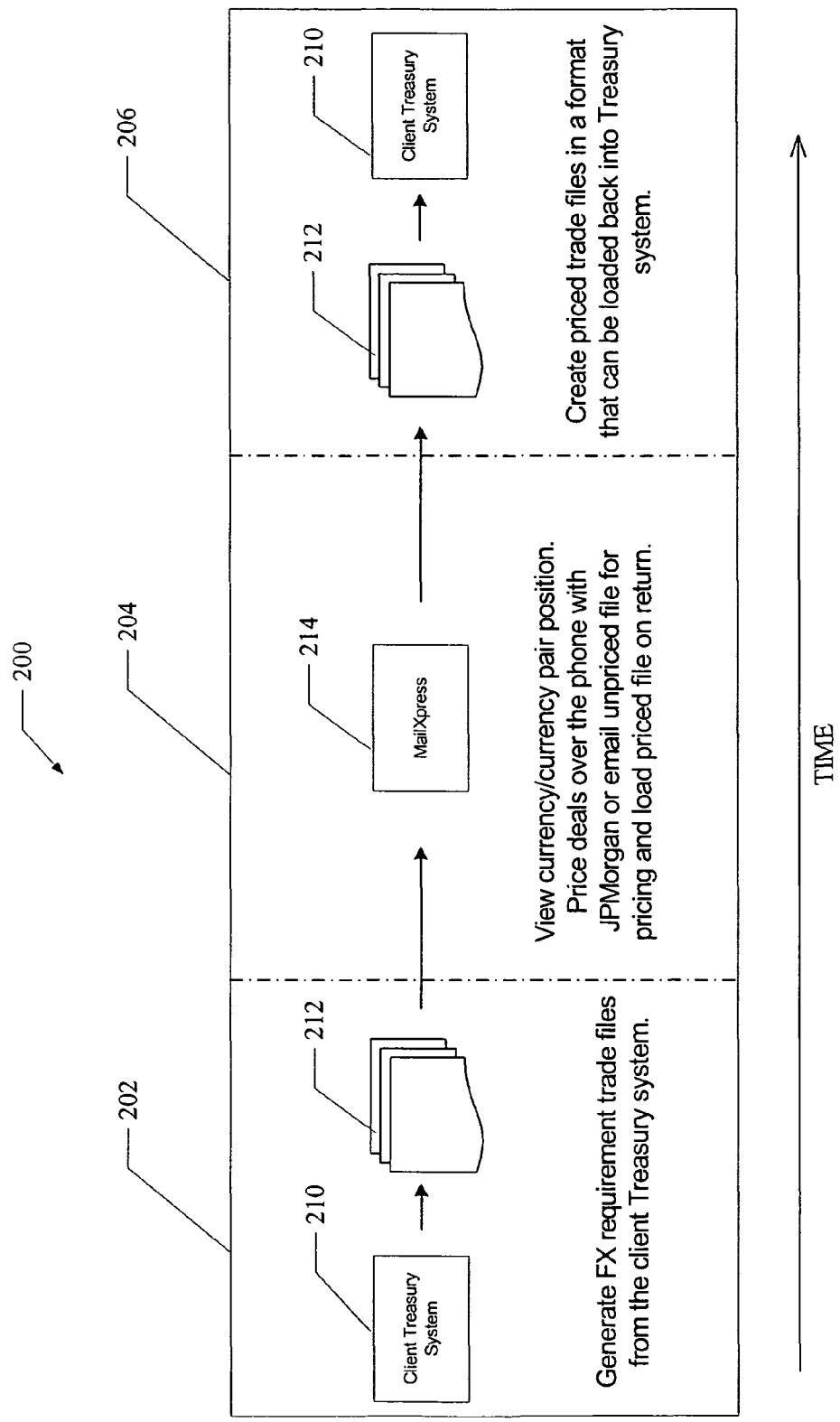
FIG. 2 is a block diagram of a process flow in accordance with an exemplary embodiment of this invention.

Turning now to FIG. 2, a block diagram of the main functionality of MailXpress is shown, generally at 200. This functionality is generally performed in PC 106 at client location 106. While MailXpress is illustrated herein as operating in a stand alone PC 106, one skilled in the art will appreciate that the functionality of MailXpress may operate, for example, as a web page supported by financial institution 120.

In general, box 202 illustrates the steps performed in preparing a financial transaction, box 204 illustrates pricing the financial transaction and box 206 illustrates displaying and storing a priced financial transaction. In box 202, the client uses a client treasury program or client treasure system 210 to enter a desired transaction or transactions. A structure 212 is populated from treasury system 210 in accordance with this exemplary embodiment of this invention that is compatible with MailXpress.

In box 204, MailXpress prices the financial transaction (currency/currency pair position, in this exemplary embodiment). The operations of box 204 may be performed manually with information provided over the telephone with the financial institution or may be performed automatically. In box 206, the structure 212 with price data is formatted for, and delivered to, client treasury system 210.

Figure 3:
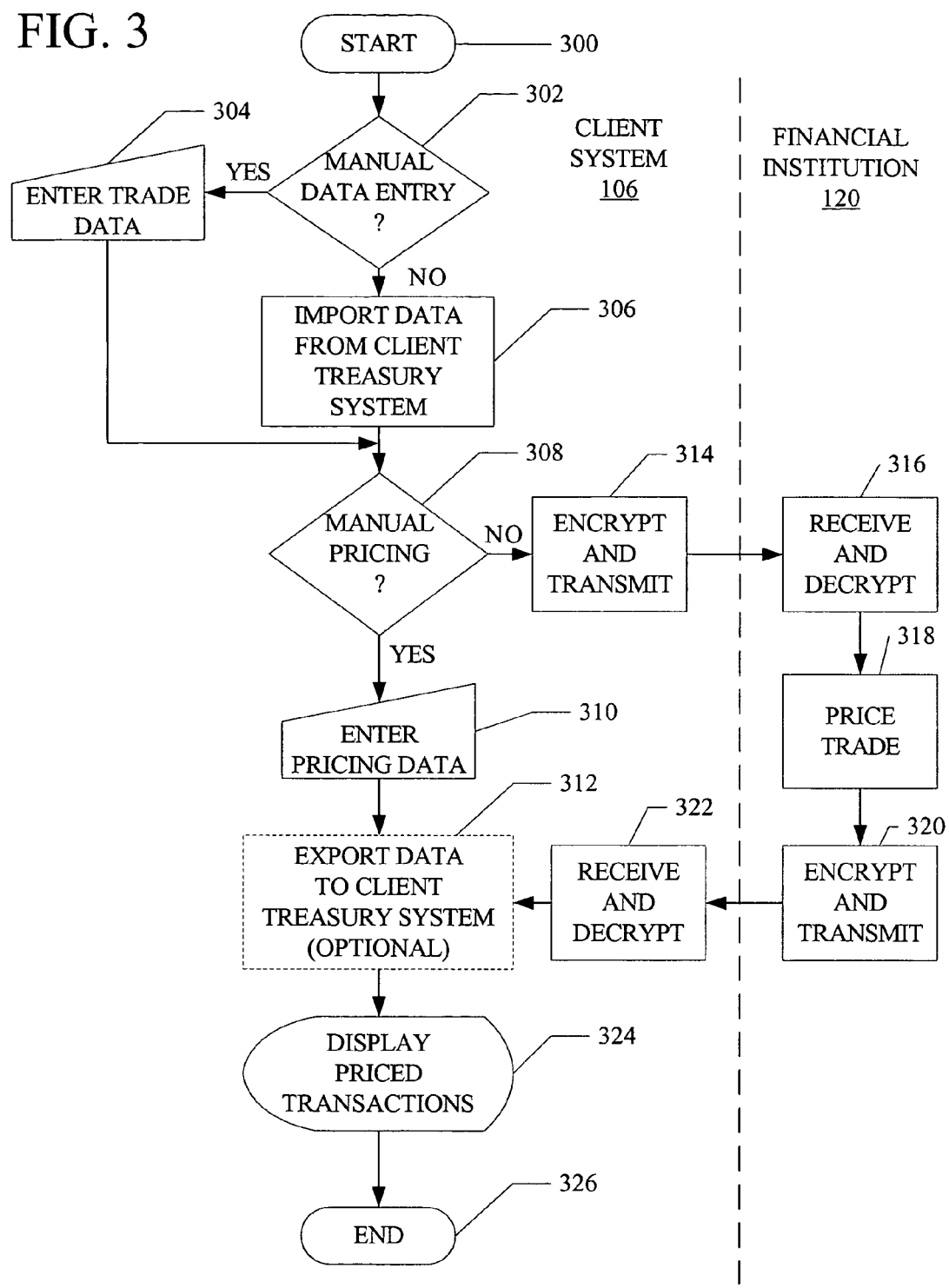
FIG. 3 is a flow chart of processing in accordance with an exemplary embodiment of this invention.

Turning now to FIG. 3, a flowchart of processing according to one aspect of this invention is shown. Processing starts in oval 300 and moves to decision diamond 302. In decision diamond 302, a determination is made whether the client will enter transaction data directly into MailXpress or whether the transaction data will be taken from a client treasury system. If the data is to be entered manually, then the client enters the transaction data directly into MailXpress in box 304. If the data is in a client treasury system, then processing proceeds to box 306, where the data is loaded into a structure for use in MailXpress. Processing from both box 304 and box 306 moves to decision diamond 308, where a determination is made whether the pricing data is to be entered manually.

If, in decision diamond 308, the pricing data is to be entered manually, then processing moves to box 310 where the pricing data is entered by the client. In this case, the client uses telephone 104 to contact a broker at telephone 122 in financial institution 120. The broker reads the data from PC 126 to the client, who enters the data into PC 106.

If, in decision diamond 308, the pricing data is to be obtained automatically, then processing proceeds to box 314, where the client trade data is encrypted and transmitted to financial institution 120. At financial institution 120, the client trade data is received and decrypted in box 316. Processing proceeds to box 318, where the trade data is priced. In box 320, the trade data, including pricing information, is encrypted and transmitted back to the client system 106. Client system 106 receives and decrypts the trade data, including the pricing information, in box 322.

Processing from both box 312 and box 322 proceeds to optional box 312, where the priced data is exported to the client's treasury system. In box 324, the priced trade data is displayed. Processing ends in oval 326.

Figure 4:
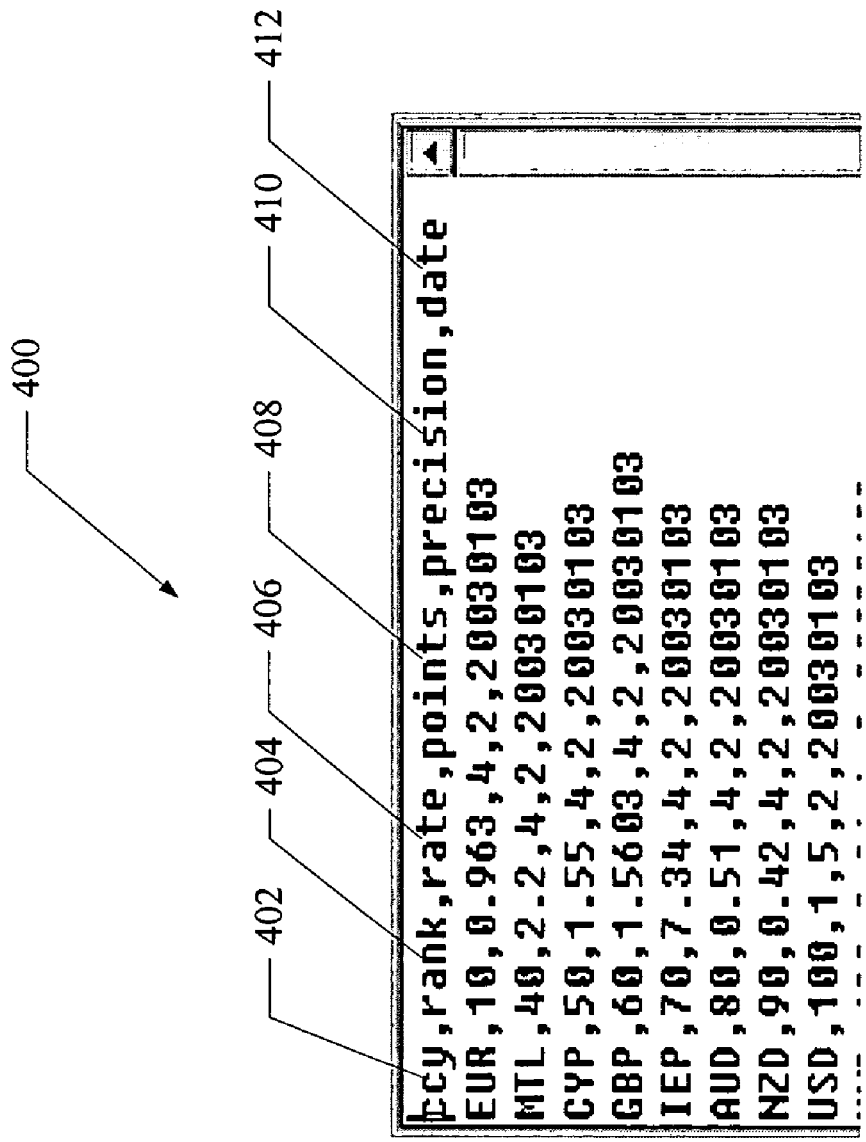
FIG. 4 is a screen shot of an exemplary currency file as used by the process flow of FIG. 2.

Turning now to FIG. 4, a screen shot of a currency file 400 is shown in accordance with one embodiment of this invention. Currency file 400 contains a list of currencies 402, rank 404, their rate 406, points-to-move 408, precision 410 and date 412 of last update. MailXpress utilizes currency file 400 to calculate the other side of a deal before it has been priced. These rates are indicative market rates and can be updated in the file or this file can be updated through an automated process on client PC 106. An updated rates file can be also requested from financial institution 120. The order of currencies in the file does not matter; however, the data contained therein is. It is important that if a rate in the file is changed that the other data is not altered.

For internal mapping of customer information, MailXpress requires the client details to be included in the trade files received. Therefore the file also contains the client name, user and email address, as well as the trade data. The important additional information is the client name. On starting up MailXpress for the first time the user is prompted for the details above. These details are then stored in a SystemDefaults.def configuration file. The details can be changed through MailXpress and, if the configuration file is deleted, MailXpress asks for these details on the next start up.

In accordance with an exemplary embodiment of this invention, the security mechanism used to encrypt a trade file is session-key encryption, which comprises a combination of 1024 bit RSA asymmetric encryption and 256 bit symmetric encryption. This encryption mechanism is a proven, secure and fast method of encrypting data.

In order for this security mechanism to work there are two security keys present. One key is unique to the client and the other being unique to the financial institution. MailXpress is supplied with the financial institution's security key; however, there is no client key initially. On encrypting a file for the first time, a unique security key is generated and each subsequent encryption call uses this key. If the key is mistakenly deleted, a new key is created on the next encryption call.

On sending a trade file to the financial institution, the security key is included in the file so that the financial institution can use it for encrypting the trade file on return. All client security keys are stored securely on an internal database at financial institution. This combination ensures that the financial institution can decrypt all trade files received from clients, encrypt the return file with the respective client's security key, and then only that client can the decrypt the received file.

There is the ability to generate a new security key and this is recommended every few months. Care should be given to making sure the financial institution is kept in synch with any changes to the key; a new security key should only be generated before the next sending of a trade file to the financial institution (i.e., not when expecting a priced confirmation trade file).

Trades are stored in MailXpress in batch files. A single batch file can contain any number of trades and consist of multiple Funds. Table I below list trade data stored within MailXpress and which values can be imported from external systems, exported from MailXpress and what data is included in the trade files exchanged with the financial institution.

TABLE I

| DATA | CLIENT IMPORT | CLIENT EXPORT | INSTITUTION EXCHANGE |
|---|---|---|---|
| Batch | Generated | Yes | Yes |
| Fund Name | Yes | Yes | Yes |
| Trade ID | Yes/generated if not | Yes | Yes |
| Side | Yes | Yes | Yes |
| Buy Currency | Yes | Yes | Yes |
| Buy Currency Amount | Yes | Yes | Yes |
| Buy Dollar Amount | No | No | No |
| Buy Spot Rate | No | Yes | Yes |
| Buy Forward Points | No | Yes | Yes |
| Buy Outright Rate | No | Yes | No |
| Sell Currency | Yes | Yes | Yes |
| Sell Currency Amount | Yes | Yes | Yes |
| Sell Dollar Amount | No | No | No |
| Sell Spot Rate | No | Yes | Yes |
| Sell Forward Points | No | Yes | Yes |
| Sell Outright Rate | No | Yes | No |
| Value Date | Yes | Yes | Yes |
| Cross Rate | No | Yes | No |
| Cross Points | No | Yes | No |
| Cross Outright Rate | Yes | Yes | Yes |

The minimum amount of detail required to upload into MailXpress for sending to a financial institution for pricing is currency1, currency2, currency1 amount or currency2 amount, as well as the value date.

Initially, the other side of the deal is calculated using the default indicative rates. The spot rates and any forward points can be entered through MailXpress, as can the cross rate and any cross points. On entering any rates the other side, dollar equivalents and overall positions are recalculated. The data for a trade can also be edited.

EXAMPLE

Figure 5:
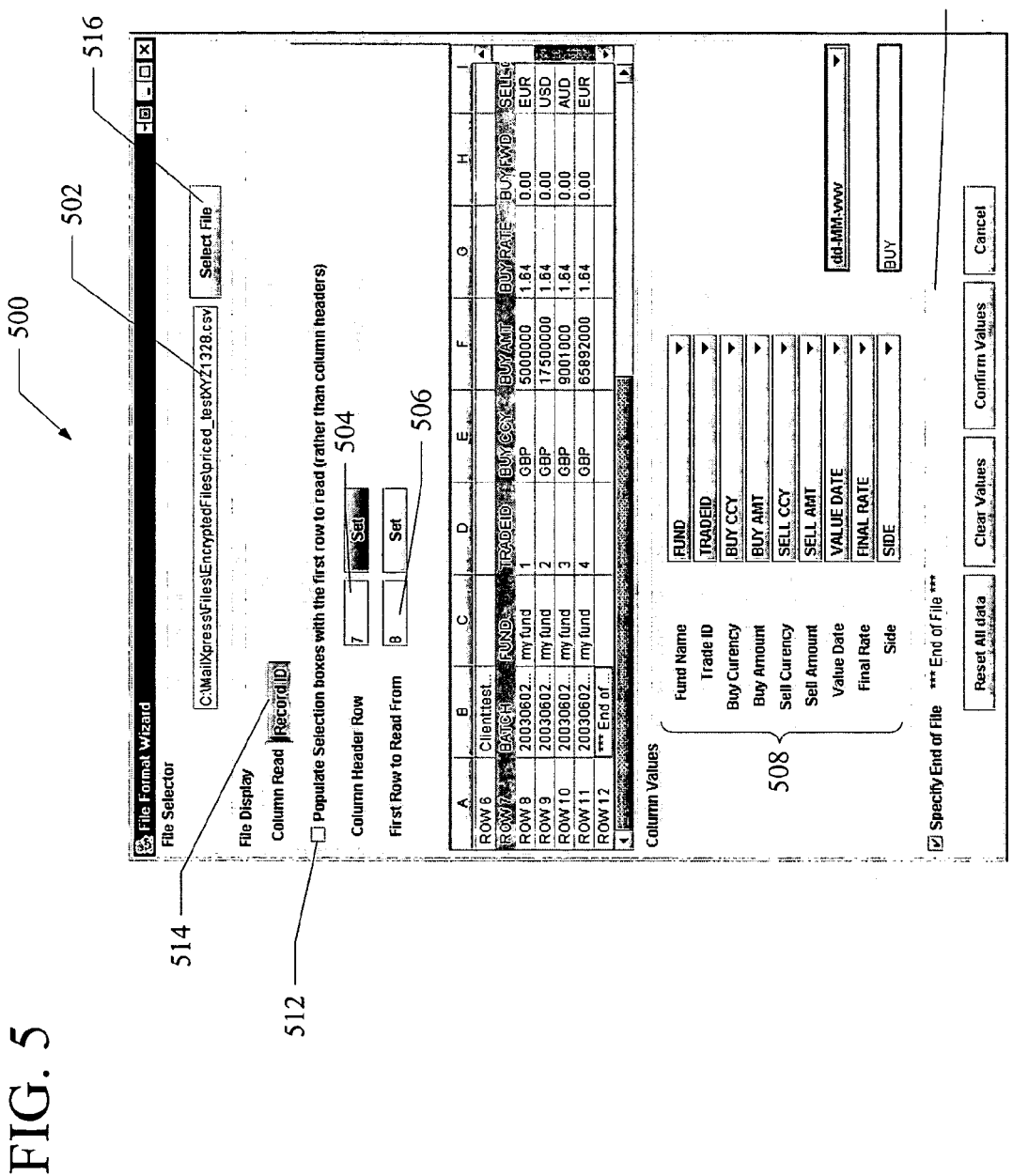
FIG. 5 is a screen shot of an exemplary file format wizard as used in the process flow of FIG. 2.
Figure 6:
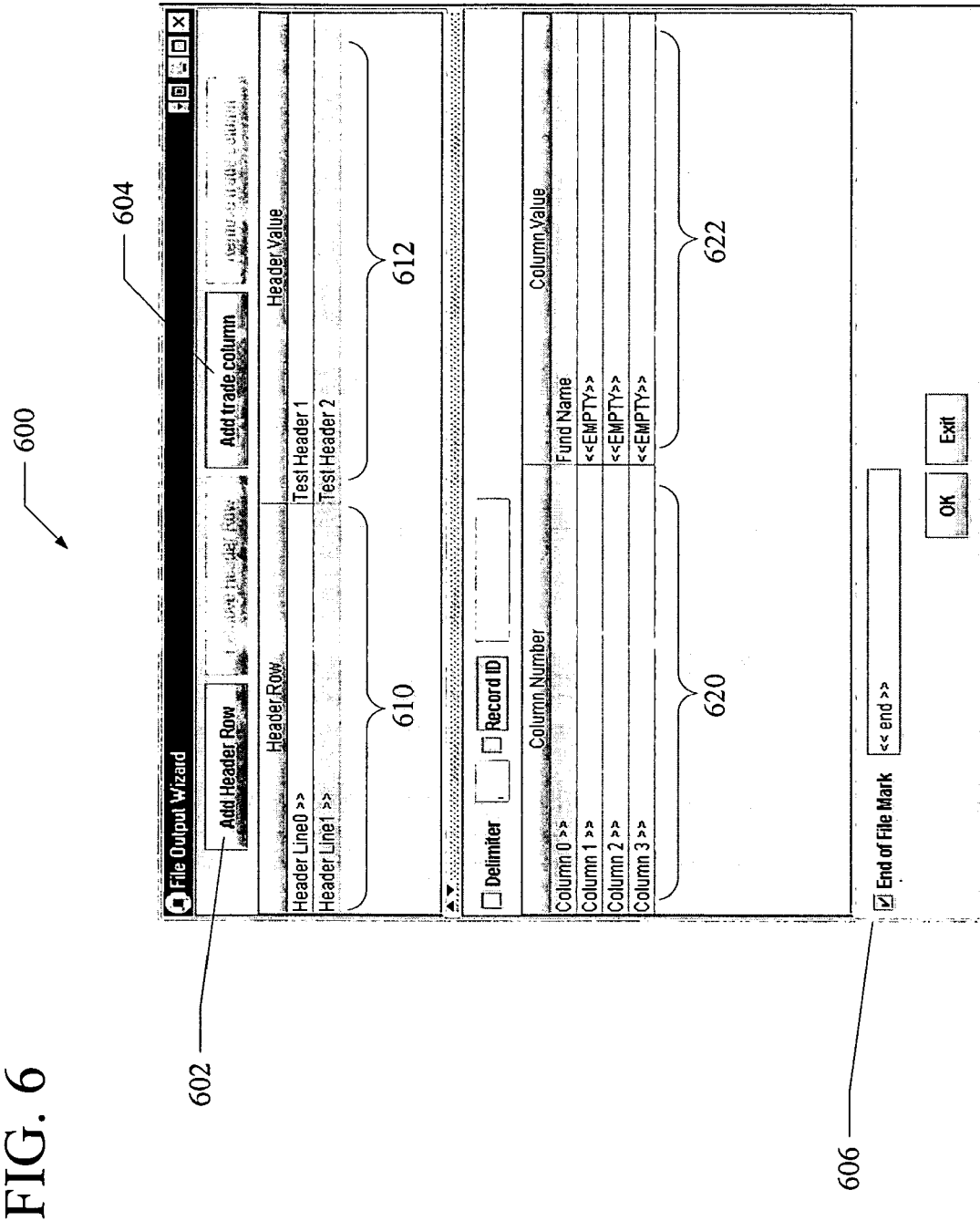
FIG. 6 is a screen shot of an exemplary output file format wizard as used in the process flow of FIG. 2.

The following is a description of the main functionality of MailXpress.
Input Wizard
Purpose
    The Input Wizard provides the client with the ability to read in any trade text file and to create a blueprint format of the file so that any subsequent files of that format can be loaded into MailXpress. A screen shot of an exemplary Input Wizard screen is shown in FIG. 5, generally at 500.
    Accessed through "Configuration/Files/Input/Input Wizard," the Input Wizard allows the user to:
    Load in a selected trade file 502;
    Specify where the column headers are (if there are any) 504;
    Specify the row where the trade data starts from 506;
    Allocate the column ordering through the drop down column value menus 508; and
    Specify if there are any end-of-file markers 510.
    The column value selection boxes by default are populated with the Column Headers on selection of the Column Header Row. If there are no column headers in the file the "Populate selection boxes with the first row to read" 512 check box should be selected. This will populate the column value selection boxes first trade data row on setting the "First Row to Read From" 506.
    There is also the option of specifying if is a record identification 514 to be used, for example if all trade lines are denoted by a "T" at the beginning of each row.
Instructions
1. Enter into the Import Wizard through "Configuration/Files/Input/Input Wizard."
2. Select the file to load through the 'Select File' button 516. This will load the contents of the trade file into the table.
3. If there are no column headings in the file check the "Populate selection boxes with the first row to read" box 512.
4. To set the column header, either enter the row number into the "Column Header Row" box 504 and click set, or click on the column header row in the table and then set. This should color the selected row cyan.
5. To set the column header, either enter the row number into the "First Row To Read From" box 506 and click set, or click on the first data row in the table and then set. This should color the selected row yellow.
6. To specify and end of file mark select the table cell with the value, and check the "Specify End of File" check box.
7. This should populate the text box with the value. Alternatively, when the check box 512 is checked, enter the value in to the text box.
8. To allocate the column placement, select the specific value in the drop down box to match the column value title 508.
9. On allocating a "Side" column the text box to the right is colored. The format that distinguishes a buy side deal should be entered in here, e.g., buy, true, B.
10. On allocating a "Value Date" column the text box to the right is colored. The date format for the value date column in the file should be selected from the drop down list.
Output Wizard
Purpose
    Enables the creation of an output format so that priced files created from MailXpress can be compatible with the Clients receiving system. A screen short of an exemplary Output Wizard screen is shown in FIG. 6, generally at 600.
    Accessed through "Configuration/Files/Output/Output Wizard," Output Wizard 600 allows the user to add in any header information at button 602 and then allocate the columns to be output at button 604.
    There is also the option to specify the delimiter 606 (default is comma), specify a record identification to be used and to allocate an end of file marker.
Instructions
1. Enter into the Import Wizard through the "Configuration/Files/Output/Output Wizard."
2. Add any header rows by using the "Add Header Row" button 602. A row will appear in the header table 610 where the user can enter the required information into the "Header Value" column 612. This information will then appear in the header section of any subsequent file output using this format.
3. For the desired number of columns in the output file, use the "Add trade column" button 604 to add a row into the column table. The column number is shown in the Column Number column with the Column Value defaulting to "<<EMPTY>>." Column 622 can remain with this value if no desired value is required in this field.

4. To set the Column Value 622, click in the selected cell. This will bring up a drop down menu from which to select the required field, which may be to buy currency, value, date, etc.
5. If the output file requires an end of file marker then check the "End of File" check box 606 and enter in the text that denotes the end of file.
6. On confirming the format, the user enters the format's name.

The input formats and output formats created can be viewed, deleted and defaults set through "Configuration/Default Settings."

Saving a File to MailXpress Format

Figure 7:
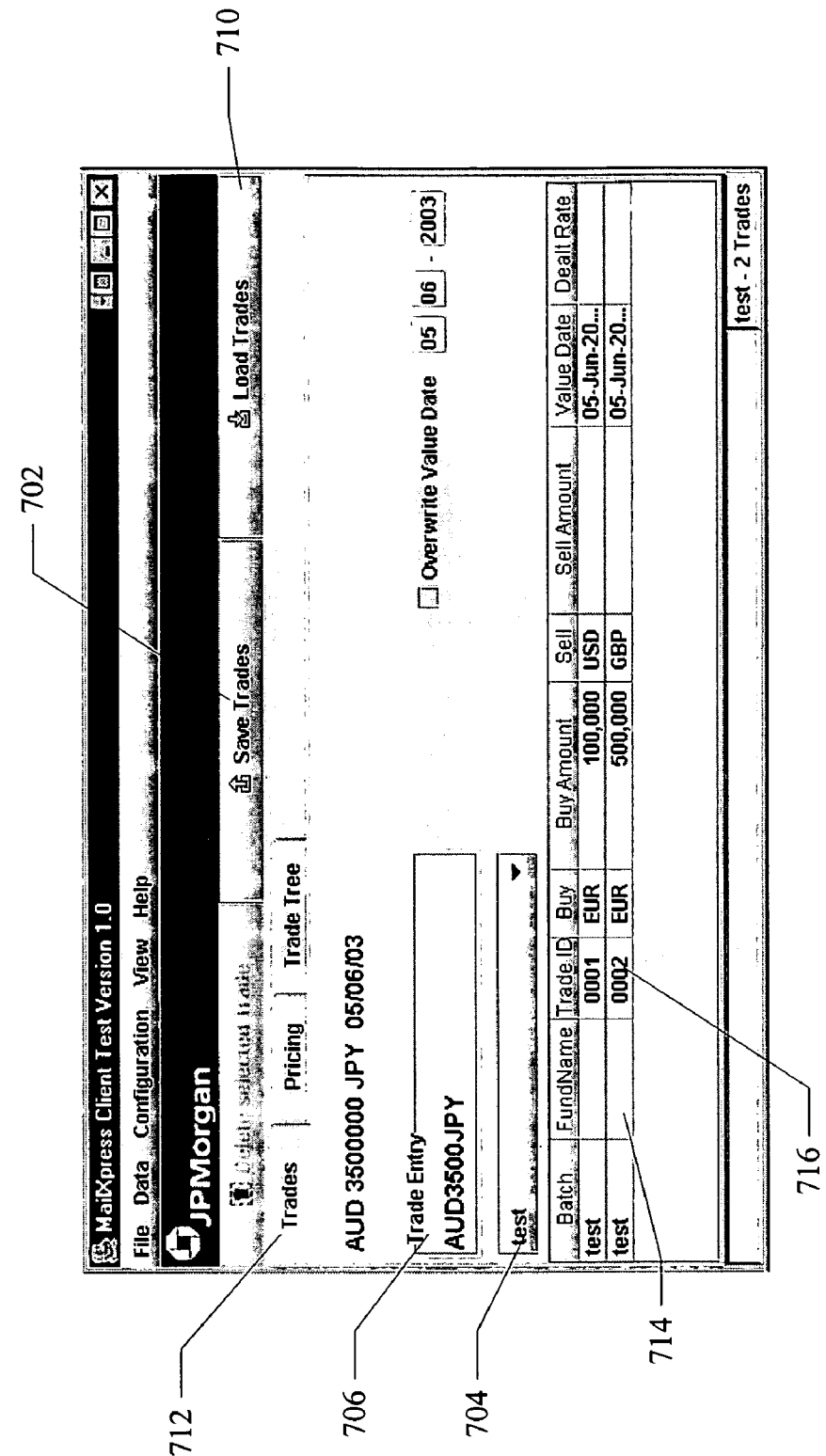
FIG. 7 is a screen shot of an exemplary main trade page as used in the process flow of FIG. 2.

Turning now to FIG. 7, a screen shot of a MailXpress trade page is shown, generally at 700.

Purpose

The files exchanged between a MailXpress client and a financial institution are of a standard MailXpress format referred to herein as a "structure." The "Save Trades" button 702 is used to create such a structure. On clicking button 702, a file chooser is displayed, the name that the file will be saved as is defaulted to the batch name selected 704. A file name may be entered manually in box 706. If multiple batches are selected then the default name is "multiple_batches.csv." Normally for the client, the files created this way will be unpriced files that are to be emailed to the financial institution for pricing. The files are then encrypted and stored in the Encrypted Files area.

On confirming the file to export MailXpress then creates an encrypted "csv" file (Comma Separated Value). The file will have a ".encrypted" suffix. The batches that the file consisted of are de-selected in MailXpress and moved to the "Pre-Priced" area, this is defaulted to "Batches\PrePriced." See the File Viewer System Defaults section on how to view the batches that been moved to the PrePriced area.

Instructions

1. Select the batch or batches to be exported.
2. Display a file chooser by clicking the "Save Trades" button 702.
3. Select the desired location and name of the file to export.
4. Save.

Load a MailXpress Format File

Purpose

The "Load Trades" button 710 is used to load files that are of the standard MailXpress structure. On clicking this button a file chooser is displayed for selecting the file to load.

Normally, for the client this will be an encrypted priced file received back from the financial institution, these files are stored in the Priced Files area which as default is the "Files\EncryptedFiles" directory.

On selecting the encrypted file, MailXpress decrypts the file, creates a new batch and extracts the trade data. This newly created batch can then be selected from the drop down selection menu on the "Trades" tab 712.

Instructions

1. Display a file chooser by clicking the "Load Trades" button 710.
2. Select the desired file to load to MailXpress.
3. Load.
4. Select the new batch from the selection box.

Load from Custom Format

Purpose

In order for MailXpress to be compatible with the client's treasury system, it needs to be able to load files that have been created from the client's treasury system. Once the format has been set up using the Input Wizard, this is now possible. Accessed through "File\InputFile\Load From My Default Format . . . ," a file chooser is displayed which allows the user to select the file to load. The location that the file chooser opens at is stored from where the file used to create the format was located.

MailXpress keeps a record of what files have been loaded so that, if a previously loaded file is attempted to be loaded again, a warning is displayed. Upon selecting the file, a new batch is created and the trade data is extracted. An import results dialogue is then shown to display the number of trades loaded and any errors that occurred. The new batch can then be selected from the drop down selection box on the Trades tab.

Instructions

1. "File\InputFile\Load From My Default Format . . . " to display the file chooser.
2. Select the desired file.
3. Load.
4. Select the new batch from the drop down selection box.

Save Priced Deals to Custom Format

Purpose

Once the trades have been priced in MailXpress, the client will need to create an unencrypted output file that can be loaded to an internal system. After creating a format through the Output Wizard this can be accomplished through the "File\OutputFile\Export Priced Trades . . . " menu option. This creates a "csv" file (Comma Separated Value) and an encrypted version of this file (".encrypted"). This functionality is only possible if all the trades in the selected batches are priced.

Instructions

1. Select the batch or batches to be exported.
2. "File\OutputFile\Export Priced Trades . . . " to display the file chooser.
3. Select the desired location and name the file to export.
4. Save Batch Selection Purpose All the deals within MailXpress are held within a batch. These batches can be viewed and priced one at a time, or many at a time. There are two ways to select a batch for viewing. The first method is by using the drop down selection box on "Trades" tab 712. Clicking on a batch name in the drop down menu will select that batch and load all the trades contained within into the main trade table. Selecting "<<No Batch Selected>>" clears out any selected batches.

Alternatively, the Batch Management screen enables more functionality to handling of the batches. The Batch Management screen can be accessed either through selecting the "<<Multiple Batches>>" item in the drop down selection box, or via the "File\Batch Management" menu option. The batch management screen enables the user to view all available batches, select any number of batches through using the arrows to move the batch over to the "Selected Batches" side, delete any selected batches, and to move a batch from the Pre-Priced location to the Priced location (see the section entitled "Batch Management" for when this would be required).

Manual Batch Creation

Purpose

As well as uploading of trade batches from a file, there is also functionality to create a batch manually.

Instructions

1. File\New Batch
2. Enter the batch name into the dialog box. The default information provided is "BatchName_yyyymmdd_h- hMM." The user can change this to whatever is desired although keeping the date and/or time in the name is recommended.

3. Once the new batch name has been confirmed, the new batch is automatically selected in the drop down selection box and the "Trade Entry" input box becomes active.

4. Manually enter trades.

Batch Management

Purpose

The Batch Management screen enables more functionality to handling of the batches. The Batch Management screen can be accessed either through selecting the "<<Multiple Batches Selected>>" item in the drop down selection box, or via the "File\Batch Management" menu option. The batch management screen enables the user to view all available batches, select any number of batches through using the arrows to move the batch over to the "Selected Batches" side and to delete any selected batches.

There is also functionality to move a batch from the Pre-Priced location to the Priced location. This is more of a clean up task when batches have been priced, a priced file has been created with the deals and the price file has been loaded to the client's internal treasury system. The "Move To Priced Location" button performs this operation and is only enabled if the current view is from the Pre-Priced location (changed through the System Defaults & Settings screen), and the desired batches to move are selected. The Priced location is "Batches/Pre-Priced/Priced."

Instructions

On entering in to the Batch Management screen any batches that are already selected will appear in the "Selected Batches" window.

Selecting a Batch
1. Select the desired batch or batches in the "Batches" window to move.
2. Use the "<<Add>>" button to move the batches over to the "Selected Batches" window.
3. If a single batch is selected that batch name is selected in the drop down selection box. If its more than one batch then the "<<Multiple Batches Selected>>" item is shown.
4. The trades within the selected batches will appear in the main trades table.

De-Selecting a Batch
1. Select the desired batch or batches in the "Selected Batches" window to move.
2. Use the "<<Remove>>" button to move the batches over to the Batches window.
3. The trades within the de-selected batches will be removed from the main trades table.

Selecting all Batches
1. Use the "<<Add All>>" button to move all the batches over to the "Selected Batches" window.
2. The "<<Multiple Batches Selected>>" item is shown in the drop down selection box on the Trades panel.
3. All trades within all the batches will appear in the main trades table.

De-Selecting all Batches
1. Use the "Remove All" button to move all the batches over to the "Batches" window.
2. The "<<No Batch Selected>>" item is shown in the drop down selection box on the Trades panel.
3. The main trades table will be cleared of all trades.

Delete Batches
1. Select the required batches to delete in the Batches window.
2. Use the "Delete Selected Batch" button to delete all selected batches.
3. Confirm (Note: deleted batches are unrecoverable).

Move Batches to Priced
1. Make sure you are viewing batches from the PrePriced location.
2. Select the required batches to move in the Batches window.
3. Use the "Move to Priced Location" button to move all selected batches.

Manual Trade Entry

Purpose

Trades can be manually entered into MailXpress through the "Trade Entry" text box 706 on the Trades tab 712. Manual entry provides fast entry for a single trade. In general, for a trade to be entered here it requires a buy currency, sell currency and either a buy amount or a sell amount. The value date will default to "Spot" but can be changed either by typing a new date in the Trade Entry box 706, or by checking the "Overwrite Value Date" 718 and entering the new date in the boxes provided.

MailXpress checks for weekends and selects the first suitable date if a weekend date is entered.

The following examples are using USD and GBP to demonstrate the format for entering a trade on the 27 Jun. 2003.

A forward date of Jul. 4, 2003 has been used for the forward example for a new month. On entering the trade data into the Trade Entry box a trade line appears above to confirm the input. If it is and invalid currency "???" will appear instead of the currency. If an invalid date is entered the date will disappear.

Format
1. The date format should be entered in the format of "DDMMYY." The entire date does not have to be entered. To alter the day all that has to be entered is the "DD." Entering "DD" will set the date to the next date for that day.
2. If this is the next month, then the month will be automatically incremented.
3. To alter the day and month all that has to be entered is "dd." If this is the next year then the year will be automatically incremented.
4. To alter the day, month and year enter the "DDMMYY."

Buy Side Spot: GBP500USD
Sell Side Spot: GBPUSD00
Buy Side Forward(new day): GBP500USD 04
Buy Side Forward(new month): GBP500USD 0407
Sell Side Forward(new day): GBPUSD500 0407
Sell Side Forward(new year): GBPUSD500 040703

Instructions
1. Select a batch.
2. Alter the "Overwrite Value Date" if needed.
3. Enter the trade details into the "Trade Entry" box.
4. Confirm details and press return.
5. The deal will be added to the last line of the main trades table.

Trade Pricing

Purpose

Figure 8:
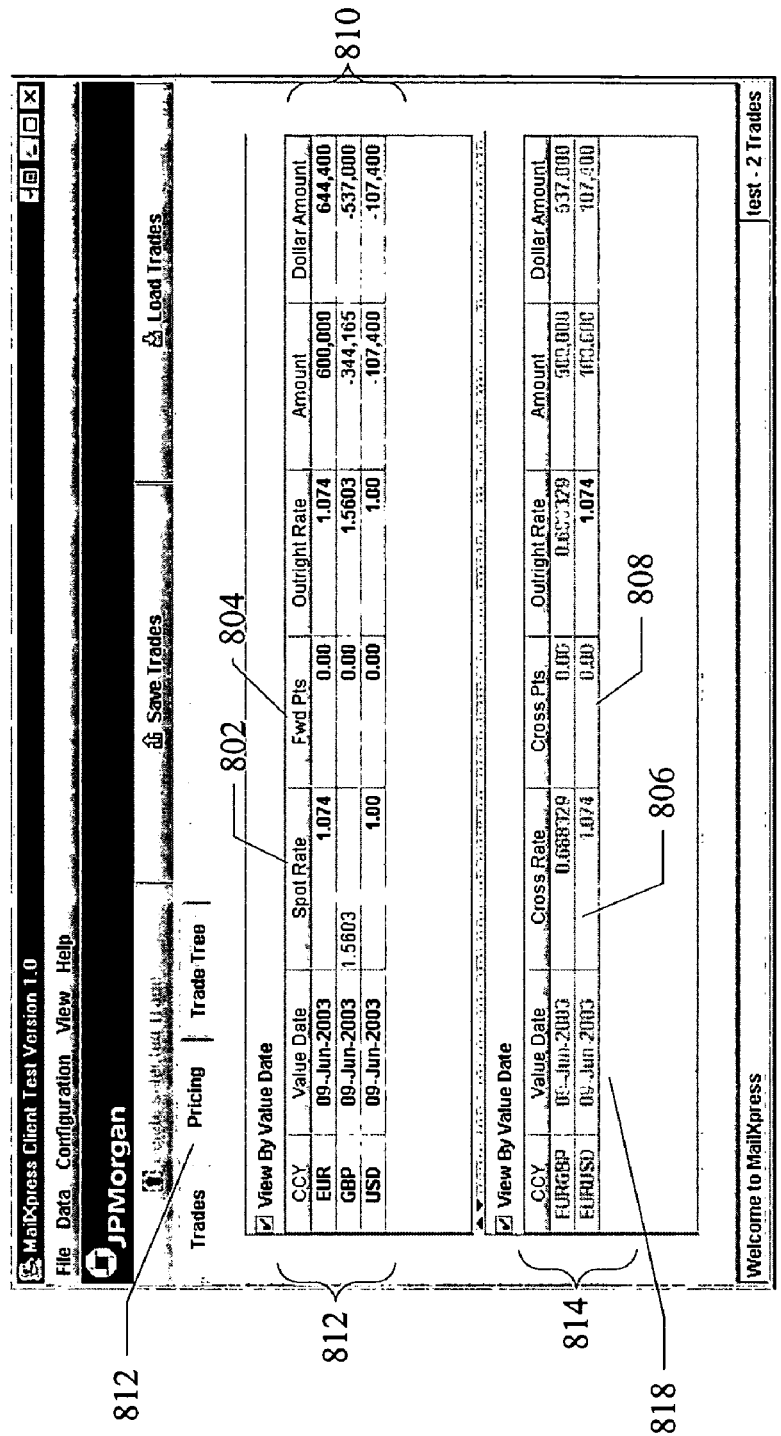
FIG. 8 is a screen shot of an exemplary pricing page as used in the process flow of FIG. 2.

Turning now to FIG. 8, a screen shot of a MailXpress view illustrating pricing according to another aspect of this invention is shown, generally at 800. MailXpress allows the user to enter currency spot rates 802, currency forward points 804, cross currency rate 806 and cross points 808. The deal's "other side" is then re-calculated and the new positions are displayed 810. The table amount values can be viewed in absolute terms, or in 000's. The display is configurable via the "View\Show Absolute Values" menu. The date format can be configured through the "View/Date Format" menu option.

The rates are entered in the "Pricing" tab 812 where there are two tables. The top table views the position on a currency level 814, with the bottom table viewed on a currency pair level 816. Both of these views can be expanded to view by value date also. If a currency pair is priced in the bottom table, then the amount for each currency is taken away from the top currency table. The coloring in the tables appears as follows:

A yellow background indicates that the currency has not been priced yet.

Grey text indicates that the currency/currency pair has been priced on the other view.

Red text in the amount column indicates a negative amount.

See the next section, "Altering Trade Details," for entering new rates, etc.

Alter Trade Details

Purpose

Once an unpriced batch has been created in MailXpress the following details can be changed. Note that once a priced batch has been received from the financial institution, the details cannot be altered.

Instructions

Currency Spot Rate: click into the "Spot Rate" column 804 in the currency position table 812. Confirming the new rate by using the "Enter" button on the keyboard also brings focus to the cell below. Start typing to enter in a rate.

Currency Forward Points: click into the "Fwd Pts" column 804 in the currency position table 812. Confirming the new points by the "Enter" button on the keyboard also brings focus to the cell below. Start typing to enter a rate. Points are entered here as "pips." (20 pips on GBP=0.002 rate). The "Outright Rate" and overall position will be adjusted accordingly.

Cross Rate: click into the "Cross Rate" column 806 in the currency pair position table 814. Confirming the new rate by the "Enter" button on the keyboard also brings focus to the cell below. Enter a rate in here.

Cross Points: click into the "Cross Pts" column 808 in the currency pair position table 814. Confirming the new points by the "Enter" button on the keyboard also brings focus to the cell below. Enter a rate in here. Points are entered here as an absolute value. (0.002 applied to a GBPUSD deal). The "Outright Rate" and overall position will be adjusted accordingly.

To unprice a currency or currency pair, enter a rate of "−1" in the rate field.

The value date can be altered on a currency pair level, changing all deals with that currency pair/value date combination. On the currency pair table 814 on the Pricing tab 812 click into the "Value Date" column 818 and enter the new date. The format accepted is in the format that the "Date Format" is set to, plus the format "yyyym-mdd." Hit enter to confirm.

The value date can also be altered only at a trade level. On the main trades table on the "Trades" tab click into the "Value Date" column 818 and enter the new date. The format accepted is as above. Hit enter to confirm.

The trade fund name can be added/altered. All the possible fund names within the selected batches are contained in the drop down fund name selection box. This is viewable in the "FundName" column 714 of the main trades table 700 (FIG. 7) once clicked into a cell. Any of the fund names can be selected, or a new fund name can be entered.

To set the fund name to be "blank," select the empty value in the drop down fund name box.

The "Trade ID" 716 can also be edited. There is a constraint in that the trade identification has to be unique in every batch.

In order to change the trade currencies, or the buy/sell amount double click on the trade and it will appear in the Trade Entry box. Alter and add as if it were a new trade.

Currencies and Market Rates

Purpose

MailXpress is supplied with an internal file of market rates for a given list of currencies. The default rate is used to calculate the other side on trade entry until a rate is entered.

Information supplied for each currency is:

Rank: used for determining the stronger currency.

Code: 3 letter standard currency code.

Rate: default market rate.

Precision: specifies the number of decimal points to show.

Points-To-Move: specifies the conversion standard for calculating pips to rate for the currency forward points.

Instructions

1. To view the currencies use the menu option 'Data/Currencies' (FIG. 4)

2. To refresh the rates after a new currency file has been applied, use the "Data/Refresh Rates" option. This will recalculate any unpriced deals with the new market rate.

Client Details

Purpose

MailXpress stores the client's details, namely user name, email address and company name. These are included in the MailXpress format files created to be sent to financial institution for pricing. This data is then used for the mapping process on the financial institution side. Therefore, the Company Name field has to be exact.

On first stating MailXpress the user is prompted for the above details. MailXpress does not start until these have been entered.

Instructions

To view and alter the client details, use the "Configuration/Communication/Customer Details" menu option.

Security

Purpose

For the secure exchange of trade files between the financial institution and MailXpress clients, the trade files are encrypted. This powerful encryption is achieved through a combination of Public-Private Key, and Session Key Cryptography. On the client side each MailXpress client has a unique Session key which plays its part in encrypting and decrypting the trade files. Therefore it is important to keep this key in synch with the financial institution. For example if Client A encrypted a file, emailed it to the financial institution for pricing, and then changed his or her Session Key, then Client A would not be able to decrypt the returned file.

Instructions

To change the Session Key use the menu option "Configuration/Communication/Generate Client Security Key."

File Viewer

Purpose

Accessed through "Data/File Viewer," the File Viewer can be used to view all the batches and files that MailXpress currently has stored. The File Viewer is a split screen that can be resized to suit.

On the left the "Batches" are listed, which consists of:

Reviewed Batches: batches that have been created but as yet no unpriced file has been generated for sending to the financial institution.

Pre-Priced Batches: batches here have been used to create an unpriced deal file for sending to financial institution.

Priced Batches: these batches were created from priced files received back from the financial institution and have been moved here as they have been priced and a priced file has been generated for loading to internal systems.

On the right, the "Files" are listed, which consists of:

Files To Send: these are files created from batches that are ready to send to the financial institution for pricing.

Financial Institution Confirmed: these are priced files received back from the financial institution and ready to be loaded to MailXpress.

Ready To Load: these are custom format files consisting of priced batches. This is the file that can be loaded into an internal system.

Previously Loaded Files: this stores any files that have been previously loaded to MailXpress.

Instructions

To view the File Viewer, use menu "Data/File Viewer."

To delete any previously loaded files, click on the file in the "Previously Loaded Files" section and press Clear.

Alternatively, to clear the entire list, click on the Clear button while no file is selected.

Defaults & Settings

Purpose

System Defaults is simply the directory structure of where the various batches and files are stored, and any formats that may exist. Accessed through "Configuration/Default Settings," the user can view and delete input and output formats, as well as have the ability to set the default format to be a particular format.

The Pick-Up Location table is how the directory structure is set up. As default MailXpress stores its data on sub-directories from where it is installed, like the "Batches" property is where the current batches are stored and defaults to "TopLevelDir:/MailXpress/Batches," and the "Encrypted Files" property is where the MailXpress output files are exported to. This defaults to "TopLevelDir:/MailXpress/Files/EncryptedFiles," where these properties point to can be set in the table.

The pickup locations consist of:
Batches
Encrypted Files
Decrypted Files
Default Rates
Security Files
JPM Priced Files Instructions Formats The current default is shown with a "(Current Default)" after it. This can be changed to another by clicking on the new default and using the "Set As Input/Output Default" button.

To delete a default click on it and use the "Delete Input/Output Format" button. This cannot be used if the selected format is set as the default.

File Pick Up Location

To change the Pickup Location click on the "Select" cell for that particular property. This brings up a file chooser which to navigate to the appropriate directory. This has immediate effect and reloads all batches from here.

To revert to the default value, uncheck the "Use Pickup" option for that property. Likewise, to use the directory in the "Pickup Location," check the "Use Pickup" option. Again, this has immediate effect and reloads all batches.

Figure 9:
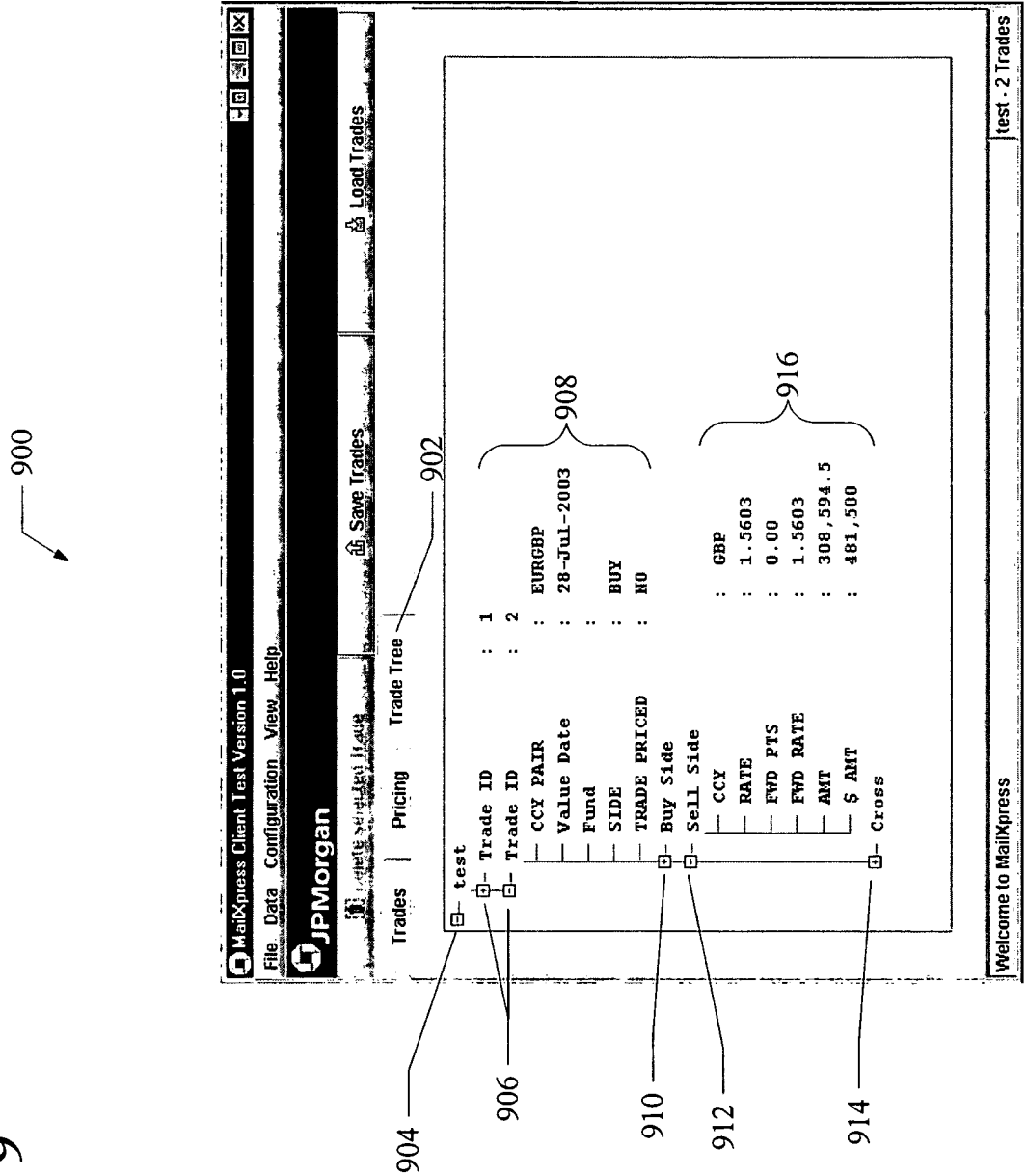
FIG. 9 is a screen shot of an exemplary Trade Tree in accordance with one aspect of this invention.

Turning now to FIG. 9, a screen short 900 is shown of a screen displayed when the "Trade Tree" tab 902 is selected.

Trades are listed in a tree structure 904 by trade ID 906. In tree structure 904, the user has the ability to expand and drill down to trade details. For example, the user can expand general details, as illustrated at 908. The user may expand "Buy Side" details 910 and "Sell Side" details 912 and "Cross" details 914. In this exemplary screen shot 900, the "Buy Side" details are selected and illustrated at 916.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A computer implemented method for pricing a foreign trade comprising:
   receiving foreign trade data entered into a programmable computer by a user;
   transmitting said foreign trade data to a pricing system via email or an email attachment;
   storing said foreign trade data in a database of said pricing system and comparing said foreign trade data against said database to prevent duplicate entries;
   receiving pricing data corresponding to said foreign trade data, wherein pricing data is manually entered by the user via the programmable computer or transmitted from said pricing system;
   calculating a price for the foreign trade using the foreign trade data, pricing data, and currency information obtained from a currency database comprising a list of currencies, currency rank, currency rate, points-to-move, currency precision and date of said currency database's last update; and
   displaying the calculated price of said foreign trade on a computer screen.

2. A method in accordance with claim 1 further comprising:
   encrypting said email or email attachment before transmitting said email or email attachment to a pricing system.

3. A method in accordance with claim 1 further comprising:
   decrypting said email or email attachment after receiving said email or email attachment from said pricing system.

4. A method in accordance with claim 1 wherein said foreign trade data is entered from the user's treasury system and wherein said method further comprises translating said foreign trade data into a form suitable for use in said programmable computer.

5. A method in accordance with claim 4 wherein displaying said foreign trade data and corresponding pricing data comprises displaying said translated foreign trade data.

6. A computer implemented method for pricing a foreign trade comprising:
   receiving foreign trade data entered into a programmable computer by a user;
   transmitting said foreign trade data to a pricing system via email or an email attachment;
   storing said foreign trade data in a database of said pricing system and comparing said foreign trade data against said database to prevent duplicate entries;
   receiving pricing data corresponding to said foreign trade data, wherein said pricing data is manually entered into the programmable computer by the user, or received from said pricing system;
   calculating a price for the foreign trade using the foreign trade data, pricing data, and currency information obtained from a currency database comprising a list of currencies, currency rank, currency rate, points-to-move, currency precision and date of said currency database's last update; and displaying the calculated price of said foreign trade on a computer screen at said user's programmable computer.

7. A method in accordance with claim 6 further comprising:

encrypting said email or email attachment at said user's programmable computer before transmitting said foreign trade data to said pricing system.

8. A method in accordance with claim 7 further comprising:

decrypting said email or email attachment at said pricing system after receiving said email or email attachment from said user's programmable computer.

9. A method in accordance with claim 6 further comprising:

encrypting said email or email attachment at said pricing system before transmitting said email or email attachment to said user's programmable computer.

10. A method in accordance with claim 9 further comprising:

decrypting said email or email attachment at said user's programmable computer after receiving said email or email attachment from said pricing system.

11. A method in accordance with claim 6 wherein said foreign trade data is entered from a user's treasury system and wherein said method further comprises translating foreign trade data into a form suitable for use in said email or email attachment.

12. A method in accordance with claim 11 wherein displaying said structure foreign trade data and corresponding pricing data comprises displaying said translated foreign trade data.

13. A method in accordance with claim 6 further comprising:

executing one or more foreign trades using said foreign trade data stored at said pricing system.

14. A computer implemented method for pricing a foreign trade comprising:

receiving foreign trade data entered into a programmable computer by a user;

transmitting said foreign trade data to a pricing system via email or an email attachment;

storing said foreign trade data in a database of said pricing system and comparing said foreign trade data against said database to prevent duplicate entries;

receiving pricing data corresponding to said foreign trade data, wherein pricing data is manually entered by said user and devoid of encrypting and decrypting, or received from a pricing system;

calculating a price for the foreign trade using the foreign trade data, pricing data, and currency information obtained from a currency database comprising a list of currencies, currency rank, currency rate, points-to-move, currency precision and date of said currency database's last update; and displaying the calculated price of said foreign trade on a computer screen.

* * * * *